(12) United States Patent
Tanaka et al.

(10) Patent No.: US 7,950,365 B2
(45) Date of Patent: May 31, 2011

(54) CONTROL APPARATUS FOR INTERNAL COMBUSTION ENGINE

(75) Inventors: Toru Tanaka, Chiyoda-ku (JP); Shinji Watanabe, Chiyoda-ku (JP); Tatsuhiko Takahashi, Kobe (JP); Masayoshi Ito, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 216 days.

(21) Appl. No.: 12/340,262

(22) Filed: Dec. 19, 2008

(65) Prior Publication Data

US 2009/0306874 A1 Dec. 10, 2009

(30) Foreign Application Priority Data

Jun. 5, 2008 (JP) ................................. 2008-148010

(51) Int. Cl.
*F02D 1/00* (2006.01)
(52) U.S. Cl. ..................................... 123/319; 123/90.16
(58) Field of Classification Search .................. 123/319, 123/321, 322, 345–348, 90.15, 90.16, 90.17; 701/102, 114, 115
See application file for complete search history.

(56) References Cited

U.S. PATENT DOCUMENTS

| 6,367,437 | B2 * | 4/2002 | Nakamura et al. | 123/90.17 |
| 6,998,846 | B2 * | 2/2006 | Daniels et al. | 324/399 |
| 7,439,700 | B2 * | 10/2008 | Shimojo et al. | 318/650 |
| 2004/0011311 | A1 * | 1/2004 | Takahashi | 123/90.15 |
| 2004/0084034 | A1 * | 5/2004 | Huberts et al. | 123/630 |

FOREIGN PATENT DOCUMENTS

| JP | 07229577 A | 8/1995 |
| JP | 2000230437 A | 8/2000 |
| JP | 2001041085 A | 2/2001 |
| JP | 2001182565 A | 6/2001 |
| JP | 2001-214766 A | 8/2001 |
| JP | 2001-234765 A | 8/2001 |
| JP | 2002054476 A | 2/2002 |
| JP | 3791658 B2 | 4/2006 |

* cited by examiner

*Primary Examiner* — John T Kwon
(74) *Attorney, Agent, or Firm* — Sughrue Mion, PLLC

(57) ABSTRACT

A control apparatus for an internal combustion engine includes an oil pressure regulating valve having a solenoid, a variable cam phase mechanism for changing a cam phase, and an ECU for controlling the oil pressure regulating valve. The ECU includes an actual cam phase detecting unit, a target cam phase setting unit, a feedback control unit, a coil temperature detecting unit, a circuit resistance calculating unit, and an integral term initial value calculating unit. When an integral term is initialized, the feedback control unit sets the holding output duty as the integral term.

7 Claims, 10 Drawing Sheets

CONTROL APPARATUS FOR INTERNAL COMBUSTION ENGINE

BACKGROUND OF THE INVENTION

1. Field of the Invention

The present invention relates to a control apparatus for an internal combustion engine for changing a cam phase with respect to a crank shaft.

2. Description of the Related Art

Conventionally, there is known a control apparatus for an internal combustion engine including: an oil pressure regulating valve having a solenoid; a variable cam phase mechanism for changing a cam phase with respect to a crank shaft by operating the oil pressure regulating valve; and a control unit for controlling the oil pressure regulating valve, the control unit including: actual cam phase detecting means for detecting the cam phase by inputting a crank angle from a crank angle sensor and by inputting a cam angle from a cam angle sensor; target cam phase setting means for setting a target cam phase with respect to the crank shaft according to a drive condition; feedback control means for outputting a duty for operating the oil pressure regulating valve so that the above-mentioned cam phase is made coincident with the above-mentioned target cam phase to perform PID feedback control of the cam phase; and learning value calculating means for learning the output duty in the case where the above-mentioned cam phase becomes a predetermined value as a learning value (refer to, for example, JP 2001-234765 A).

In the above-mentioned control apparatus for the internal combustion engine, for instance, when an ignition key is turned ON, the feedback control means commences a PID feedback control of a cam phase, while such a learning value which has already been learned is employed as an initial value of an integral term of the feedback control means.

However, in the above-mentioned control apparatus for the internal combustion engine, the learning value which is set as the initial value of the integral term corresponds to such a value of the output duty that the learning value calculating means learned in the case where the cam phase has become the predetermined value as the learning value in the past, but this learning value is not equal to a learning value corresponding to temperature of a coil in the case where the PID feedback control is commenced by the feedback control means. As a result, there is such a problem that a response characteristic of the PID feedback control is deteriorated.

SUMMARY OF THE INVENTION

The present invention has been made to solve the above-mentioned problems, and therefore, has an object to provide a control apparatus for an internal combustion engine, capable of improving a response characteristic of a PID feedback control.

A control apparatus for an internal combustion engine according to the present invention includes: an oil pressure regulating valve having a solenoid; a variable cam phase mechanism for changing a cam phase with respect to a crank shaft by operating the oil pressure regulating valve; and a control unit for controlling the oil pressure regulating valve, the control unit including: actual cam phase detecting means for detecting the cam phase by inputting a crank angle from a crank angle sensor and by inputting a cam angle from a cam angle sensor; target cam phase setting means for setting a target cam phase with respect to the crank shaft according to a drive condition; output duty calculating means for calculating an output duty which is output to a coil of the solenoid; feedback control means for calculating a control value which is output to the output duty calculating means so that the cam phase is made coincident with the target cam phase to control the cam phase with PID feedback control. The control unit further includes: coil temperature detecting means for detecting a temperature of the coil by inputting a temperature of the coil from a coil temperature sensor or predicting a temperature of coil by inputting a temperature of cooling water from a cooling water temperature sensor; circuit resistance calculating means for calculating a resistance of an electric circuit which operates the oil pressure regulating valve, by multiplying the detected or predicted temperature of the coil by a temperature gradient so as to correct a resistance of the coil; and integral term initial value calculating means for calculating a holding output duty corresponding to the output duty in a case where the cam phase is held by employing the calculated resistance of the electric circuit. The feedback control means setting the holding output duty as an integral term in a case where the integral term is initialized.

According to the control apparatus for the internal combustion engine of the present invention, when the integral term of the feedback control means has been initialized, the integral term initial value calculating means calculates the holding output duty by employing the resistance of the electric circuit corrected based upon the temperature of the coil, and this holding output duty is used as the integral term by the feedback control means. As a result, the response characteristic of the PID feedback control can be improved.

BRIEF DESCRIPTION OF THE DRAWINGS

In the accompanying drawings:

FIG. 4 is a flow chart for describing process flow operation in which the control apparatus for the internal combustion engine of FIG. 1 judges whether or not an ignition key is turned ON;

DETAILED DESCRIPTION OF THE PREFERRED EMBODIMENTS

Figure 1:
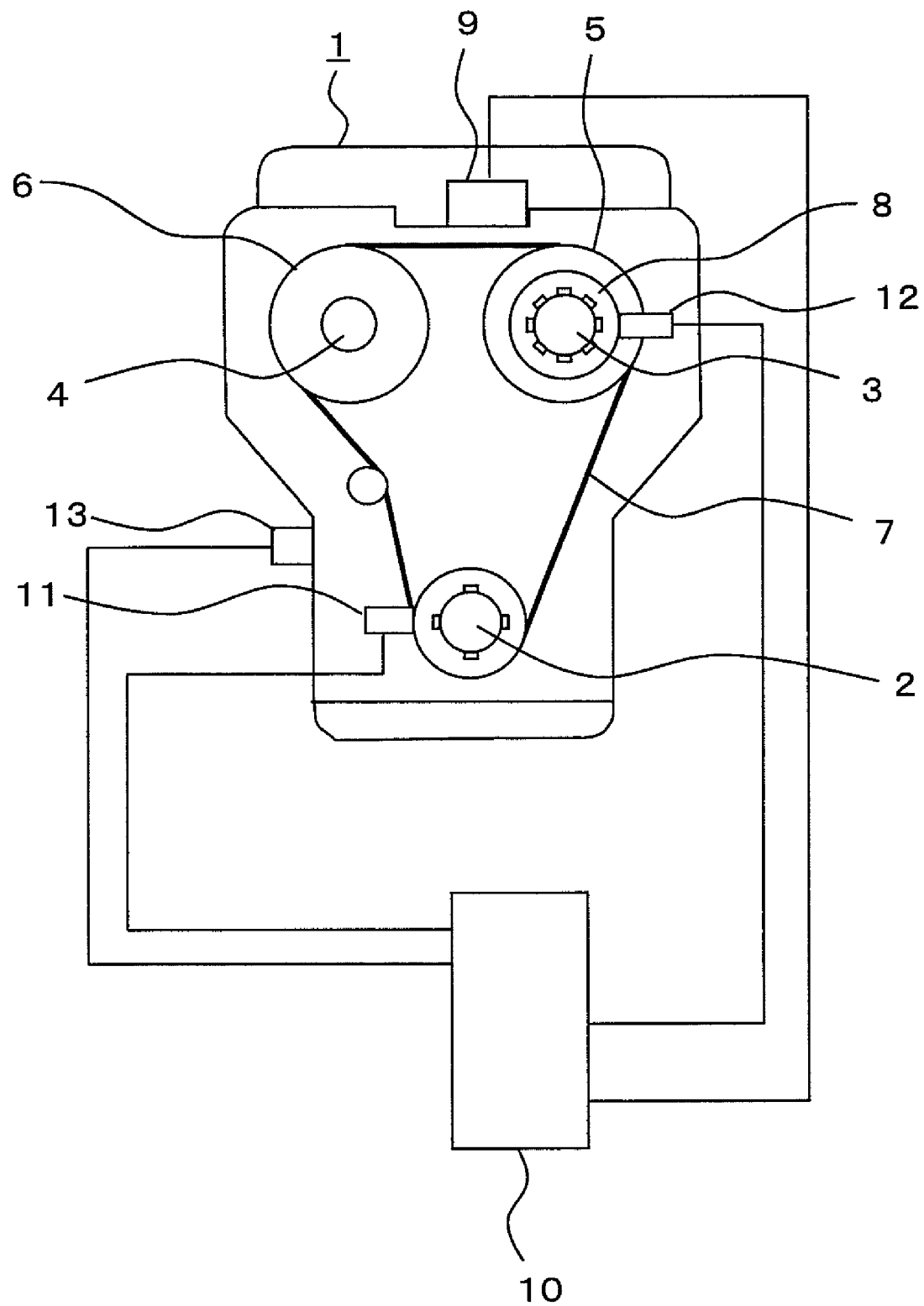
FIG. 1 is a structural diagram for showing a control apparatus for an internal combustion engine according to a first embodiment of the present invention.

Referring now to drawings, a description is made of various embodiments of the present invention. It should be understood that the same reference numerals will be employed as those for denoting the same, or similar structural elements in the respective drawings.

First Embodiment

FIG. 1 is a structural diagram for showing a control apparatus for an internal combustion engine according to a first embodiment of the present invention.

An internal combustion engine 1 on which the control apparatus for the internal combustion engine according to the first embodiment is mounted corresponds to a 4-cycle DOHC type gasoline engine. The internal combustion engine 1 is provided with a rotatable crank shaft 2, an intake camshaft 3, and an exhaust camshaft 4. A plurality of intake cams (not shown) for opening/closing intake valves (not shown) are provided to the intake cam shaft 3 in an integral form. A plurality of exhaust cams (not shown) for opening/closing exhaust valves (not shown) are provided to the exhaust cam shaft 4 in an integral form.

A first driven sprocket 5 which is rotated in conjunction with the intake cam shaft 3 is provided to the intake cam shaft 3.

A second driven sprocket 6 which is rotated in conjunction with the exhaust cam shaft 4 is provided to the exhaust cam shaft 4.

A timing chain 7 is continuously wound on the crank shaft 2, the first driven sprocket 5, and the second driven sprocket 6. Since the crank shaft 2 is rotated by two turns, both the intake cam shaft 3 and the exhaust cam shaft 4 may be rotated by one turn.

It should be noted that the internal combustion engine 1 is not limited only to the above-mentioned 4-cycle DOHC type gasoline engine, but also to other types of engines.

The control apparatus for the internal combustion engine according to the first embodiment is equipped with a variable cam phase mechanism 8, an oil pressure regulating valve 9, and an engine control unit (ECU) 10. The variable cam phase mechanism 8 is provided between the intake cam shaft 3 and the first driven sprocket 5, and causes the intake cam shaft 3 to be freely rotatable within a predetermined range with respect to the first driven sprocket 5. The oil pressure regulating valve 9 opens and closes a flow path of oil which is fed from an oil pump (not shown) driven by the internal combustion engine 1 to the variable cam phase mechanism 8. The ECU 10 corresponds to a control unit which controls operation of the oil pressure regulating valve 9.

Since the oil pressure regulating valve 9 opens and closes the flow path of the oil, oil pressure within the variable cam phase mechanism 8 is controlled, and hence the intake cam shaft 3 is pivotally moved with respect to the first driven sprocket 5.

As a result, the cam phase corresponding to the phase of the intake cam is changed with respect to the crank shaft 2.

A fluid chamber (not shown) into which the supplied oil is filled is formed in the variable cam mechanism 8.

A vane (not shown) formed on the intake cam shaft 3 in an integral form is movably provided within the fluid chamber.

Both an advancing chamber (not shown) and a retarding chamber (not shown) are segmented by the fluid chamber and the vane.

When the flow path of the oil to the advancing chamber is opened by operating the oil pressure regulating valve 9, an internal oil pressure of the advancing chamber is increased, and the vane is moved in such a direction that the advancing chamber becomes larger, and hence the intake cam shaft 3 is pivotally moved along an advancing direction with respect to the first driven sprocket 5.

On the other hand, when the flow path of the oil to the retarding chamber is opened by operating the oil pressure regulating valve 9, an internal oil pressure of the retarding chamber is increased, and the vane is moved in such a direction that the retarding chamber becomes larger, and hence the intake cam shaft 3 is pivotally moved along a retarding direction with respect to the first driven sprocket 5.

The oil pressure regulating valve 9 is equipped with a solenoid (not shown) containing a coil, and a spool (not shown). The spool is moved by a solenoid current flowing through the coil.

Since the ECU 10 controls the solenoid current flowing through the coil, the spool is moved in a stepless manner, and hence the flow path of the oil to one of the advancing chamber and the retarding chamber of the variable cam phase mechanism 8 is opened and closed.

For instance, in the case where an average solenoid current is a holding current (0.56 A), the spool is located at a neutral position, and the flow paths of the oil to the advancing chamber and the retarding chamber are closed.

When an average solenoid current is larger than the holding current, the spool is moved along one direction, and the flow path of the oil to the advancing chamber is opened, and hence the oil is supplied to the advancing chamber, and thus, the internal oil pressure of the advancing chamber is increased.

If a cam phase becomes a predetermined advancing condition, the average solenoid current is set to the holding current, and the flow path of the oil to the advancing chamber is closed, and hence the cam phase is held under the predetermined advancing condition.

On the other hand, when an average solenoid current is smaller than the holding current, the spool is moved along the other direction, and the flow path of the oil to the retarding chamber is opened, and hence the oil is supplied to the retarding chamber, and thus, the internal oil pressure of the retarding chamber is increased.

If a cam phase becomes a predetermined retarding condition, the average solenoid current is set to the holding current, and the flow path of the oil to the retarding chamber is closed, and hence the cam phase is held under the predetermined retarding condition.

Also, the above-mentioned control apparatus for the internal combustion engine is equipped with a crank angle sensor 11, a cam angle sensor 12, and a cooling water temperature sensor 13. The crank angle sensor 11 is provided to the crank shaft 2 so as to detect a crank angle. The cam angle sensor 12 is provided to the intake cam shaft 3 so as to detect a cam angle. The cooling water temperature sensor 13 detects a temperature of cooling water which is circulated within a cylinder block of the internal combustion engine 1.

The crank angle sensor 11 is constituted by a magnet rotor and an MRE pickup. Since the crank shaft 2 is rotated, the crank angle sensor 11 outputs a pulse signal to the ECU 10 every time the crank angle becomes a predetermined crank angle.

The cam angle sensor 12 is constituted by a magnet rotor and an MRE pickup. Since the intake cam shaft 3 is rotated, the cam angle sensor 12 outputs a pulse signal to the ECU 10 every time the cam angle becomes a predetermined cam angle.

The cooling water temperature sensor 13 outputs a signal of a detected temperature of the cooling water to the ECU 10.

A battery sensor (not shown) is provided to a battery which drives the oil pressure regulating valve 9, and outputs a signal of a battery voltage.

The ECU 10 corresponds to a microcomputer equipped with an I/O interface, a CPU, a RAM, and a ROM. In the ECU 10, respective signals output from the crank angle sensor 11, the cam angle sensor 12, and the cooling water temperature sensor 13 are A/D-converted by the I/O interface, and the A/D-converted signals are shaped, and thereafter, the shaped signals are input to the CPU.

The CPU judges a drive condition of the internal combustion engine 1 in response to the input respective signals, and controls the oil pressure regulating valve 9 by employing a control program and data stored in the ROM, and also, data stored in the RAM according to the judged drive condition.

Figure 2:
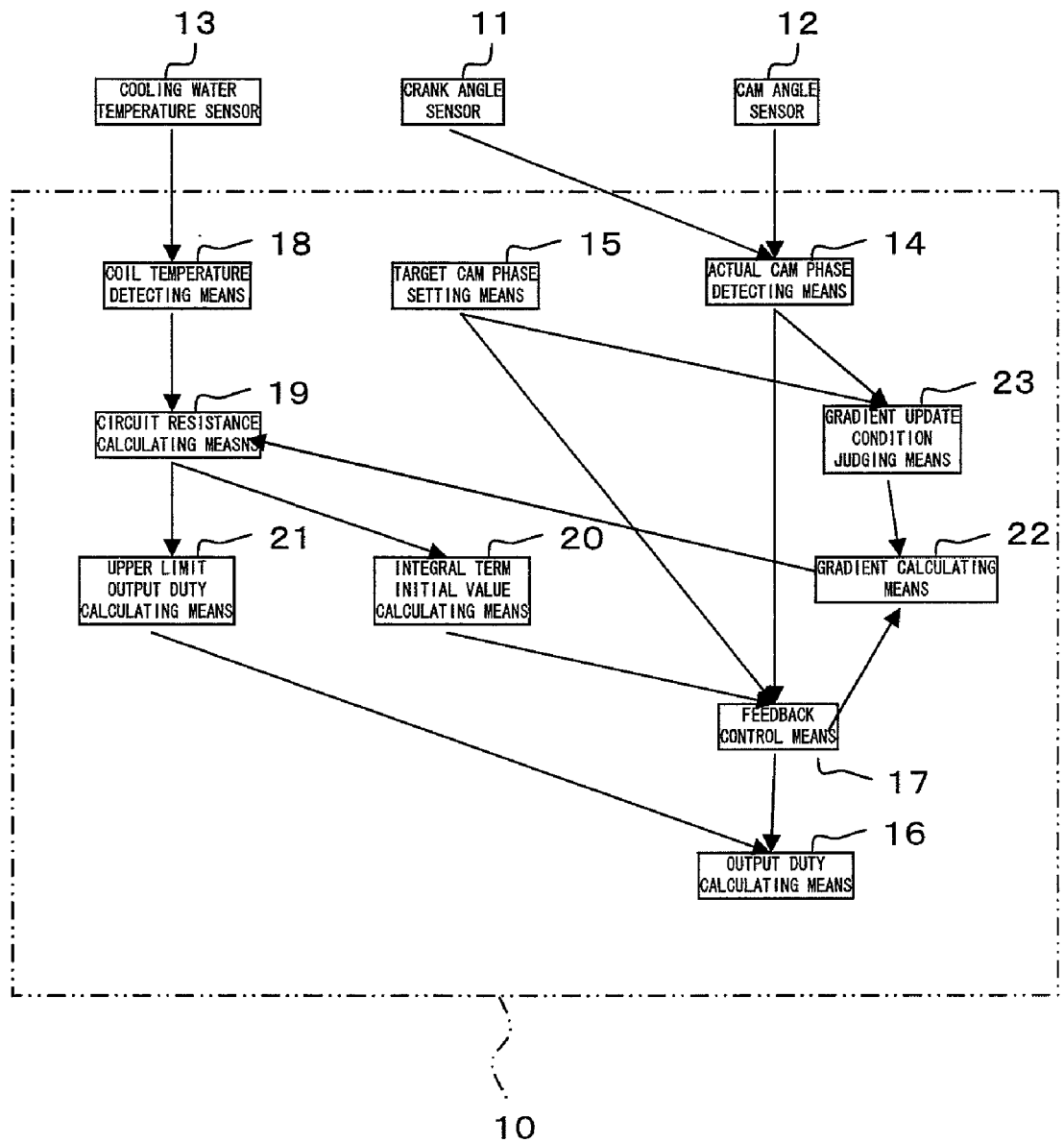
FIG. 2 is a block diagram for showing an internal arrangement of an ECU provided in the control apparatus of FIG. 1.

FIG. 2 is a block diagram for indicating an internal arrangement of the ECU 10 of FIG. 1.

The ECU 10 is equipped with actual cam phase detecting means 14, target cam phase setting means 15, output duty calculating means 16, and feedback control means 17. The actual cam phase detecting means 14 detects a cam phase based upon a crank angle input from the crank angle sensor 11, and a cam angle input from the cam angle sensor 12. The target cam phase setting means 15 sets a target cam phase with respect to the crank shaft 2 according to the drive condition. The output duty calculating means 16 calculates an output duty which is output to the coil of the solenoid. The feedback control means 17 calculates a control value which is output to the output duty calculating means 16 in such a manner that the cam phase is made coincident with the target cam phase, and then, controls the cam phase with PID feedback control.

The output duty calculating means 16 performs such a final processing as a voltage correcting operation with respect to the control value input from the feedback control means 17.

Also, the ECU 10 is equipped with coil temperature detecting means 18, circuit resistance calculating means 19, and integral term initial value calculating means 20. In the coil temperature detecting means 18, a temperature of the cooling water is input from the cooling water temperature sensor 13 so as to predict a temperature of the coil based upon the input temperature of the cooling water. The circuit resistance calculating means 19 multiplies the predicted temperature of the coil by a temperature gradient corresponding to a coefficient to correct the resistance of the coil, and thus, calculates a resistance of an electric circuit which operates the oil pressure regulating valve 9. The integral term initial value calculating means 20 calculates a holding output duty corresponding to the output duty in the case where the holding current flows through the coil by employing the calculated resistance of the electric circuit.

It should be noted that in the coil temperature detecting means 18, a temperature of the coil is input from a coil temperature sensor so as to detect a temperature of the coil based upon the input temperature of the coil.

The integral term initial value calculating means 20 outputs the calculated holding output duty to the feedback control means 17, and then, the feedback control means 17 employs the input holding output duty as an initial value of an integral term in the PID feedback control.

The circuit resistance calculating means 19 sub-divides a resistance "R" [Ω] of a resistor of the electric circuit which operates the oil pressure regulating valve 9 into a coil resistance "R1" [Ω] of a coil which is influenced by temperature, and an electric circuit portion resistance "R2" [Ω] of an electric circuit portion corresponding to an area except for the coil of the electric circuit which operates the oil pressure regulating valve 9, and calculates these divided resistances "R1" [Ω] and "R2" [Ω].

The electric circuit portion is provided with a harness (not shown) which couples the oil pressure regulating valve 9 to the ECU 10, a wiring line within a circuit board (not shown) of the ECUO, and a driving element (not shown) which drives the oil pressure regulating valve 9.

In the first embodiment, it is so assumed that the electric circuit portion resistance "R2" is a summed value of a resistance of the harness, a resistance of the wiring line within the circuit board, and a resistance of the driving element at the normal use temperature.

In other words, the electric circuit portion resistance "R2" is a constant value.

It is known that the coil resistance "R1" has a proportional relation with respect to a temperature where −234.5° C. is defined as an origin. Assuming now that the temperature of the coil is "T" [° C.], the resistance "R" of the electric circuit is calculated based upon Formula (1) described below.

$$R = R1 \times (234.5+T)/(234.5+20) + R2 \tag{1}$$

If Formula (1) described above is modified to a function of the temperature "T" of the coil, then Formula (2) described below is obtained.

$$R = K1 \times T + K2 \tag{2}$$

It should also be noted that values "K1" and "K2" are calculated based upon Formulae (3) and (4) described below.

$$K1 = R1/(234.5+20) \tag{3}$$

$$K2 = R1 \times 234.5/(234.5) + R2 \tag{4}$$

The value "K1" is referred to as a "temperature gradient" that the circuit resistance calculating means 19 uses for correcting the coil resistance "R1" by multiplying a predicted temperature of the coil by the temperature gradient "K1", and the value "K2" is referred to as an "offset".

As a result, as to the resistance "R" of the electric circuit, it is not necessary to previously form a map for correcting the resistance "R" of the electric circuit based upon the temperature "T" of the coil, and hence manufacturing cost of the control apparatus for the internal combustion engine can be reduced. Also, compared with such a case where the map is formed, while being adapted to a plurality of control apparatuses for internal combustion engines, the resistance "R" of the electric circuit can be corrected.

Also, the resistance "R" of the electric circuit which contains not only the coil resistance "R1", but also the electric circuit portion resistance "R2" is calculated, and hence an error of the holding output duty calculated by the integral term initial value calculating means 20 can be reduced.

Also, only the coil resistance "R1" within the resistance "R" of the electric circuit is corrected by employing the temperature "T" of the coil, and hence an error of the resistance "R" of the electric circuit can be reduced.

Assuming now that an output duty is "D" [%], an average solenoid current is "C" [A], a battery voltage is "Vb" [V], and a resistance calculated by the circuit resistance calculating means 19 is "R" [Ω], Formula (5) described below is established based upon the Ohm's law.

$$Vb \times D/100 = C \times R \tag{5}$$

In such a case where the battery voltage "Vb" is selected to be 14 V, such a holding output duty "DHOLD" [%] that the average solenoid current "C" is a holding current (0.56 A) by which the cam phase is held is calculated from Formula (6) described below.

$$DHOLD = 0.56 \times R \times 100/14 \qquad (6)$$

The integral term initial value calculating means 20 calculates the holding output duty "DHOLD" by employing Formula (6) described above.

Due to the nature of the PID feedback control, the integral term of the feedback control means 17 becomes equal to a control value in such a case where an actual cam phase is made coincident with a target cam phase.

At this time, since the control value is also equal to the holding output duty "DHOLD", the feedback control means 17 employs the holding output duty "DHOLD" calculated based upon Formula (6) as an initial value of the integral term in the PID feedback control.

Since the feedback control means 17 does not correct the control value by employing the holding output duty "DHOLD", for example, even in such a case where the coil temperature detecting means 18 predicts that the temperature of the coil has changed due to the error operation of the coil temperature detecting means 18, it is possible to avoid that the feedback control by the feedback control means 17 is adversely influenced by the error operation of the coil temperature detecting means 18.

Also, in comparison with a control apparatus for an internal combustion engine, which is equipped with current detecting means for detecting an average solenoid current, the holding output duty "DHOLD" by which the average solenoid current becomes the holding current is employed as the initial value of the integral term, and hence the construction can be made simpler.

As a result, the control apparatus for the internal combustion engine can be made compact, and the energy consumption amount caused by detecting the average solenoid current can be reduced.

Also, the ECU 10 is equipped with upper limit output duty calculating means 21, gradient calculating means 22, and gradient update condition judging means 23. The upper limit output duty calculating means 21 calculates an upper limit output duty based upon a resistance of the electric circuit calculated by the circuit resistance calculating means 19, while the upper limit output duty corresponds to an upper limit of the output duty. The gradient calculating means 22 calculates the temperature gradient "K1" of the circuit resistance calculating means 19 by employing the control value calculated by the feedback control means 17 or the integral term thereof, and then updates the calculated temperature gradient "K1". The gradient update condition judging means 23 permits updating of the temperature gradient "K1" by the gradient calculating means 22 in such a case where the cam phase becomes substantially coincident with the target cam phase.

The upper limit output duty calculated by the upper limit output duty calculating means 21 is output to the output duty calculating means 16.

Assuming now that the upper limit value of the average solenoid current is equal to 1 A, an upper limit output duty "DMAX" is calculated based upon Formula (7) described below by utilizing Formula (5) described above by the upper limit output duty calculating means 21.

$$DMAX = 1 \times R \times 100/14 \qquad (7)$$

As a consequence, since the temperature "T" of the coil is predicted, the coil resistance "R1" is calculated. Accordingly, the upper limit output duty "DMAX" can be calculated, and hence an upper limit of the output duty "D" calculated by the output duty calculating means 16 can be set.

It should also be noted that, when the battery voltage "Vb" is not equal to 14 V, the output duty calculating means 16 calculates the output duty "D" by employing a control value "DFB" [%] of the feedback control means 17 in accordance with Formula (8) described below.

$$D = \text{MIN}(DFB, DMAX) \times Vb/14 \qquad (8)$$

Next, a description is made of a calculation of the temperature gradient "K1" by the gradient calculating means 22.

When the battery voltage "Vb" is selected to be 14 V and the average solenoid current "C" is selected to be the holding current (0.56 A), a present resistance "RNOW" is calculated by employing an integral term "I" of the feedback control means 17 in accordance with Formula (9) described below.

$$RNOW = I \times 14/(0.56 \times 100) \qquad (9)$$

Also, a present temperature gradient "K1NOW" is calculated by employing the present resistance "RNOW" and the electric circuit portion resistance "R2" in accordance with Formula (10) described below.

$$K1NOW = (RNOW - R2)/(234.5 + T) \qquad (10)$$

Both the upper limit value and the lower limit value of the coil resistance "R1" are employed in Formula (3) described above, and hence both an upper limit value and a lower limit value of the temperature gradient "K1" are calculated.

Now, assuming that the coil resistance "R1" is 7.4 Ω, tolerance is ±0.5 Ω, and the temperature "T" of the coil is 20° C., an upper limit value "K1MAX" of the temperature gradient "K1" and a lower limit value "K1MIN" of the temperature gradient "K1" are calculated based upon Formulae (11) and (12) described below.

$$K1MAX = (7.4 + 0.5)/(234.5 + 20) \qquad (11)$$

$$K1MIN = (7.4 - 0.5)/(234.5 + 20) \qquad (12)$$

It should also be understood that, when changes over time of the coil are also considered, correction values caused by the changes over time may be added to the upper limit value "K1MAX" and the lower limit value "K1MIN", which are calculated from Formulae (11) and (12) described above.

The temperature gradient "K1" which is actually updated is calculated by employing Formulae (11) and (12) described above in accordance with Formula (13) described below.

$$K1 = \text{MAX}\{\text{MIN}(K1NOW, K1MAX), K1MIN\} \qquad (13)$$

It should also be noted that, while the temperature gradient "K1" is stored in a backup RAM, for example, even when the battery is cut off, a center value "K1MID" of the temperature gradient "K1" may be employed, which has been stored in the backup RAM.

In other words, in the PID feedback control immediately after the battery is cut off, the integral term initial value calculating means 20 calculates the holding output duty "DHOLD" by employing the center value "K1MID" of the temperature gradient "K1" represented in Formula (14) described below, and then, the feedback control means 17 defines the calculated holding output duty "DHOLD" as an initial value of the integral term.

$$K1MID = 7.4/(234.5 + 20) \qquad (14)$$

As a consequence, when a first PID feedback control immediately after the battery is cut off is carried out, an error caused by manufacturing the coil is generated in the initial value of the integral term.

However, after the feedback control means 17 has executed the PID feedback control, and hence the cam phase is made coincident with the target cam phase, the temperature gradient "K1" is updated by employing Formula (10) described above by the gradient calculating means 22. As a result, it is possible to reduce the error which is contained in an initial value of an integral term calculated after the temperature gradient "K1" has been updated.

Next, a description is made of process flow operation executed by the above-mentioned control apparatus for the internal combustion engine according to the first embodiment.

Figure 3:
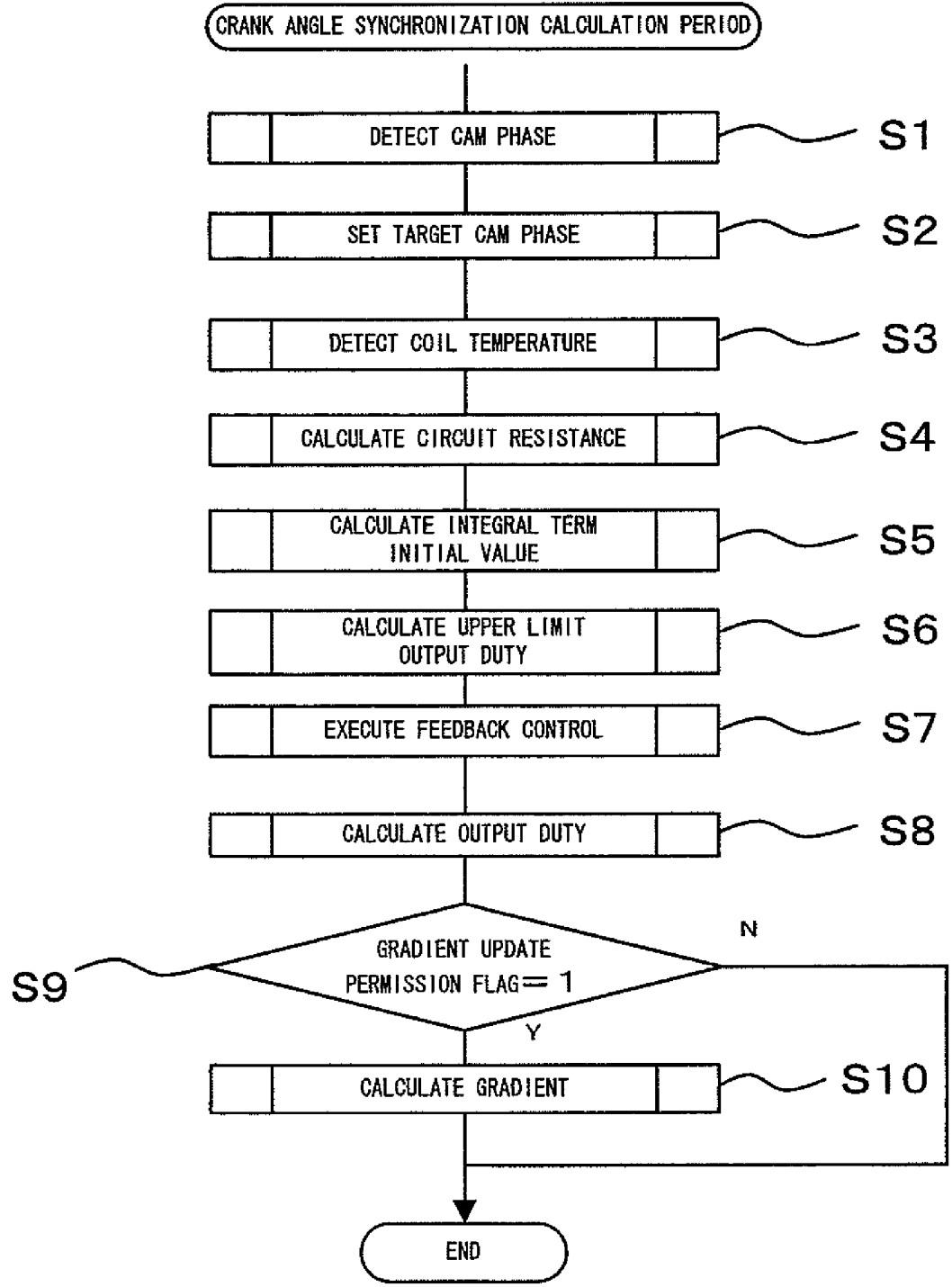
FIG. 3 is a flow chart for describing process flow operation executed by the control apparatus for the internal combustion engine shown in FIG. 1.

FIG. 3 is a flow chart for describing process flow operation executed by the control apparatus for the internal combustion engine shown in FIG. 1.

In this control apparatus for the internal combustion engine, control processings thereof are executed in crank angle synchronization calculation periods.

It should be noted that the respective control processings may be apparently executed not only in the above-mentioned time period, but also in a time period of, for example, 10 ms.

Firstly, since a crank angle is input from the crank angle sensor 11 and a cam angle is input from the cam angle sensor 12, the actual cam phase detecting means 14 detects a cam phase based upon the input crank angle and the input cam angle (Step S1).

Next, the target cam phase setting means 15 sets a target cam phase by employing a map which has been previously determined based upon an accelerator rotation number and an accelerator open degree, which indicate a drive condition (Step S2).

In addition, the coil temperature detecting means 18 predicts the temperature "T" of the coil based upon a temperature of the cooling water (Step S3).

Next, with employment of Formula (2) described above, the circuit resistance calculating means 19 multiplies the predicted temperature "T" of the coil by the temperature gradient "K1" so as to correct the coil resistance "R1", and to calculate the resistance "R" of the electric circuit which operates the oil pressure regulating valve 9 (Step S4).

Moreover, with employment of the calculated resistance "R" of the electric circuit and Formula (6) described above, the integral term initial value calculating means 20 calculates the holding output duty "DHOLD" which constitutes an initial value of an integral term of the feedback control means 17 (Step S5).

Next, with employment of Formula (7) described above, the upper limit output duty calculating means 21 calculates the upper limit output duty "DMAX", and then, outputs the calculated upper limit output duty "DMAX" to the output duty calculating means 16 (Step S6).

In addition, the feedback control means 17 calculates a control value for controlling the output duty calculating means 16 in such a manner that the cam phase is made coincident with the target cam phase, and then, outputs the calculated control value to the output duty calculating means 16 (Step S7).

Next, the output duty calculating means 16 calculates the output duty "D" based upon the control value calculated by the feedback control means 17, and then, the calculated output duty "D" is output to the coil of the solenoid (Step S8).

In addition, the gradient update condition judging means 23 judges whether or not the gradient calculating means 22 is permitted to update the temperature gradient "K1" (Step S9).

In Step S9, in such a case where the gradient update condition judging means 23 judges that updating of the coefficient by the gradient calculating means 22 has been permitted, the gradient calculating means 22 calculates the temperature gradient "K1" of the circuit resistance calculating means 19 by employing the control value calculated by the feedback control means 17 or the integral term thereof so as to update the temperature gradient "K1" (Step S10), and then, this control processing is accomplished.

On the other hand, in Step S9, in such a case where the gradient update condition judging means 23 judges that updating of the temperature gradient "K1" by the gradient calculating means 22 has not been permitted, this control processing is directly accomplished.

Next, a description is made of process flow operation in which the control apparatus for the internal combustion engine according to the first embodiment judges whether or not an ignition key is turned ON.

Figure 4:
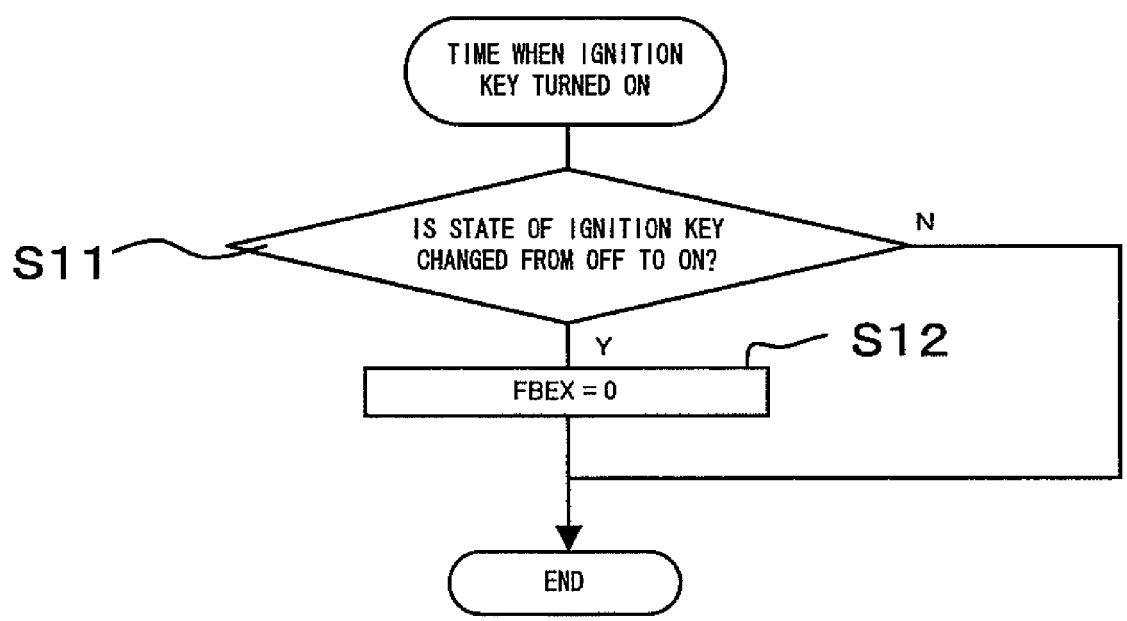

FIG. 4 is a flowchart for describing the process flow operation for judging whether or not the ignition key is turned ON, executed by the control apparatus for the internal combustion engine shown in FIG. 1.

In the ECU 10, an experience flag "FBEX" is provided, while the experience flag "FBEX" indicates that a PID feedback control by the feedback control means 17 has already been carried out.

This experience flag "FBEX" becomes 1 in such a case where the PID feedback control by the feedback control means 17 has already been carried out, whereas the experience flag "FBEX" becomes 0 in such a case where the PID feedback control by the feedback control means 17 has not yet been carried out.

Firstly, the ECU 10 judges whether or not the ignition key has been turned from an OFF state to an ON state (Step S11).

Next, when the ECU 10 judges that the ignition key has been turned from the OFF state to the ON state in Step S11, the ECU 10 sets the experience flag "FBEX" to 0 (Step S12), and then, accomplishes the above-mentioned judging process flow operation.

On the other hand, when the ECU 10 judges that the ignition key has not yet been turned from the OFF state to the ON state in Step S11, the ECU 10 directly accomplishes the judging process flow operation.

Next, a description is made of processings for judging whether or not a feedback control operation of the feedback control means 17 employed in the control apparatus for the internal combustion engine according to the first embodiment is commenced.

Figure 5:
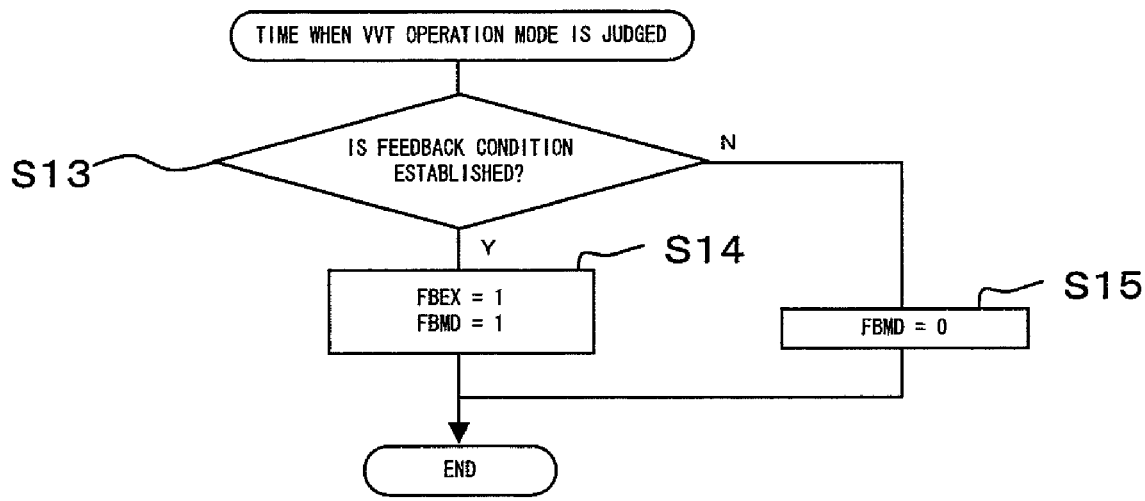
FIG. 5 is a flow chart for describing process flow operation for judging whether or not feedback control means employed in the control apparatus for the internal combustion engine of FIG. 1 starts a feedback control operation.

FIG. 5 is a flow chart for describing process flow operation for judging whether or not the feedback control means 17 employed in the control apparatus for the internal combustion engine of FIG. 1 starts the feedback control operation.

In the ECU 10, a feedback mode flag "FBMD" is provided, while the feedback mode flag "FBMD" indicates that a PID feedback control by the feedback control means 17 is presently being executed.

This feedback mode flag "FBMD" becomes 1 in the case where the PID feedback control by the feedback control means 17 is presently being carried out, whereas this feedback mode flag "FBMD" becomes 0 in the case where the PID feedback control by the feedback control means 17 is not presently being carried out.

As a condition for starting the PID feedback control by the feedback control means 17, such a condition that the target cam phase is larger than 0 degree and the temperature of the cooling water is higher than 20° C. is set to the control apparatus for the internal combustion engine.

It should also be understood that the condition for judging whether or not the PID feedback control by the feedback control means 17 is commenced is not limited only to the above-mentioned condition, but other conditions may be alternatively employed.

Firstly, the ECU 10 judges whether or not the condition for starting the PID feedback control by the feedback control means 17 is established (Step S13).

In Step S13, in the case where the ECU 10 judges that the condition for starting the PID feedback control by the feedback control means 17 has been established, the ECU 10 sets the experience flag "FBEX" to 1, and further, sets the feedback mode flag "FBMD" to 1 (Step S14), and then accomplishes the judging process.

On the other hand, in Step S13, in the case where the ECU 10 judges that the condition for starting the PID feedback control by the feedback control means 17 has not yet been established, the ECU 10 sets the feedback mode flag "FBMD" to 0 (Step S15), and then, accomplishes the judging process.

Next, a description is made of process flow operation of the PID feedback control executed by the feedback control means 17.

Figure 6:
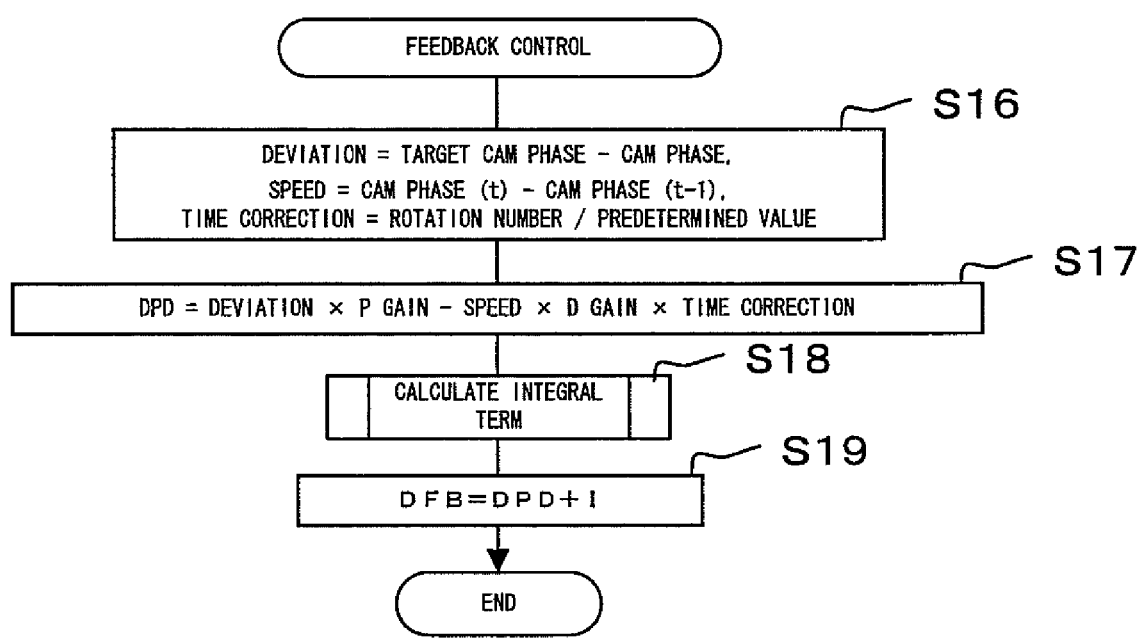
FIG. 6 is a flow chart for describing process flow operation of a PID feedback control executed by the feedback control means of FIG. 2.

FIG. 6 is a flow chart for describing process flow operation of the PID feedback control executed by the feedback control means 17 of FIG. 2.

Firstly, the feedback control means 17 calculates a deviation which corresponds to a difference between the cam phase and the target cam phase, also calculates a speed of the cam phase based upon a difference between a present cam phase and a preceding cam phase, and moreover, calculates a value as a time correction, which is obtained by dividing a rotation number of the cam phase by a previously-set predetermined value (Step S16).

It should be understood that the above-mentioned predetermined value implies a rotation number of the cam phase in the case where a PID control gain is adapted.

Next, the feedback control means 17 calculates a PD term calculation result "DPD" which is equal to a difference between a value obtained by multiplying the deviation by a P gain, and another value obtained by multiplying the speed by a D gain and the time correction (Step S17).

In addition, the feedback control means 17 calculates the integral term "I" (Step S18).

Finally, the feedback control means 17 calculates a feedback operation amount "DFB" which corresponds to such a value obtained by adding the integral term "I" discussed later to the PD term calculation result "DPD" (Step S19).

It should also be noted that both the P gain and the D gain are fixed values which are adapted at a predetermined rotation number of the cam phase.

Next, a description is made of process flow operation for calculating the integral term "I" by the feedback control means 17.

Figure 7:
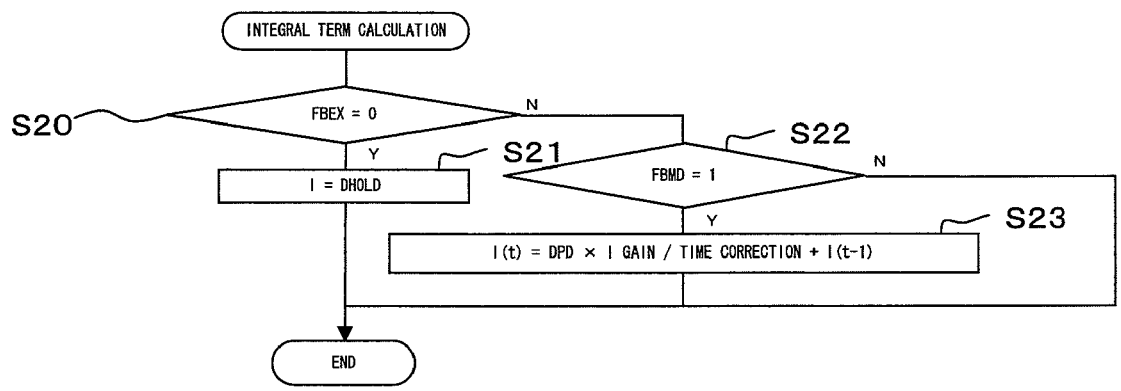
FIG. 7 is a flow chart for describing process flow operation for calculating an integral term of FIG. 6.

FIG. 7 is a flow chart for describing process flow operation for calculating the integral term "I" of FIG. 6.

Firstly, the feedback control means 17 judges whether or not the experience flag "FBEX" is 0 (Step S20).

In Step S20, when the feedback control means 17 judges that the experience flag "FBEX" is 0, the feedback control means 17 substitutes the holding output duty "DHOLD" calculated in Step S5 for the integral term "I" (Step S21), and then, accomplishes this calculation process operation.

On the other hand, in Step S20, when the feedback control means 17 judges that the experience flag "FBEX" is 1, the feedback control means 17 judges whether or not the feedback mode flag "FBMD" is 1 (Step S22).

In Step S22, when the feedback control means 17 judges that the feedback mode flag "FBMD" is 1, the feedback control means 17 multiplies the PD term calculation result "DPD" by an I gain, and further, adds the value divided by the time correction to the value of the previously-calculated integral term "I" so as to calculate a present integral term "I" (Step S23), and then, accomplishes the calculation process flow.

It should also be noted that the above-mentioned I gain implies a fixed value adapted at a predetermined rotation number of the cam phase.

On the other hand, in Step S22, when the feedback control means 17 judges that the feedback mode flag "FBMD" is 0, the feedback control means 17 directly accomplishes the calculation process flow without changing the integral term "I".

Next, a description is made of process flow operation for judging whether or not a gradient updating operation is permitted by the gradient update condition judging means 23.

Figure 8:
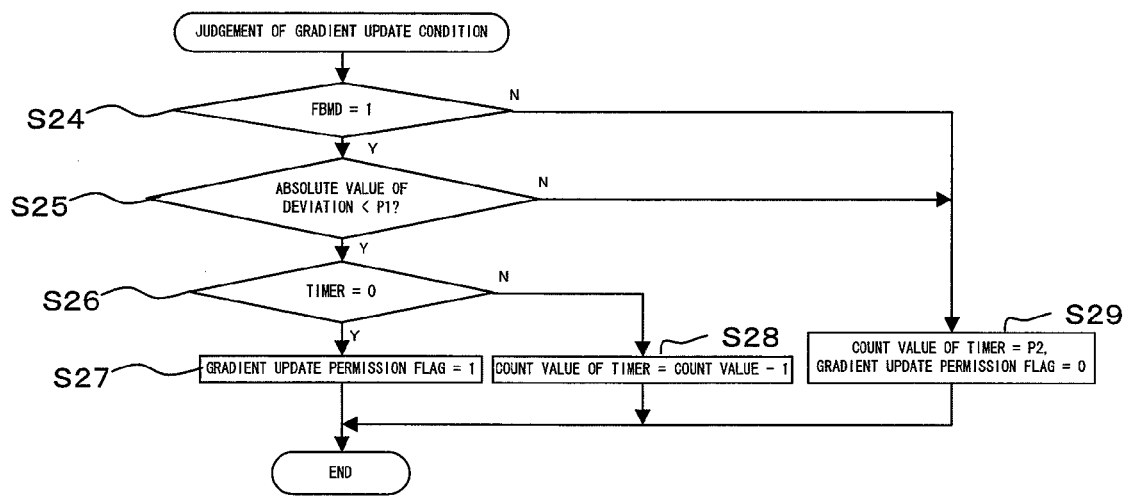
FIG. 8 is a flow chart for describing process flow operation for judging whether or not a gradient updating operation of FIG. 2 is permitted.

FIG. 8 is a flow chart for describing process flow operation for judging whether or not the gradient updating operation of FIG. 2 is permitted.

In the gradient update condition judging means 23, a gradient update permission flag for indicating that a gradient updating operation is permitted, and a continuous time measuring-purpose timer for measuring a predetermined time are provided.

This gradient update permission flag becomes 1 when the gradient updating operation has been permitted, and becomes 0 when the gradient updating operation has not yet been permitted.

Firstly, the gradient update condition judging means 23 judges whether or not the feedback mode flag "FBMD" is 1 (Step S24).

In Step S24, when the gradient update condition judging means 23 judges that the feedback mode flag "FBMD" is 1, the gradient update condition judging means 23 judges whether or not an absolute value of the deviation is smaller than a predetermined value "P1" (Step S25), while the deviation corresponds to the difference between the cam phase and the target cam phase.

On the other hand, in Step S24, when the gradient update condition judging means 23 judges that the feedback mode flag "FBMD" is 0, the gradient update condition judging means 23 sets a predetermined value "P2" to the continuous time measuring-purpose timer, and sets the gradient update permission flag to 0 (Step S29), and then, accomplishes this gradient update permission judging process flow.

In Step S25, when the gradient update condition judging means 23 judges that the absolute value of the deviation is smaller than the predetermined value "P1", the gradient update condition judging means 23 judges whether or not a count value of the continuous time measuring-purpose timer is 0 (Step S26).

On the other hand, in Step S25, when the gradient update condition judging means 23 judges that the absolute value of the deviation is larger than the predetermined value "P1", the gradient update condition judging means 23 is advanced to Step S29.

In Step S26, when the gradient update condition judging means 23 judges that the count value of the continuous time measuring-purpose timer is 0, the gradient update condition judging means 23 sets the gradient update permission flag to 1 (Step S27), and then, accomplishes the gradient update permission judging process flow.

On the other hand, in Step S26, when the gradient update condition judging means 23 judges that the count value of the continuous time measuring-purpose timer is not 0, the gradient update condition judging means 23 subtracts 1 from the count value of the continuous time measuring-purpose timer (Step S28), and then, accomplishes this gradient update permission judging process flow.

According to the control apparatus for the internal combustion engine of this first embodiment, when the integral term "I" of the feedback control means 17 is initialized, the integral term initial value calculating means 20 calculates the holding output duty "DHOLD" by employing the resistance "R" of the electric circuit corrected by using the temperature "T" of the coil, and then, the feedback control means 17 sets this holding output duty "DHOLD" as the integral term "I". As a result, the response characteristic of the PID feedback control can be improved.

Also, after the ignition key has been turned ON, when the feedback control means 17 performs the PID feedback control for the first time, the integral term "I" is initialized, and the integral term initial value calculating means 20 calculates the holding output duty "DHOLD" by employing the coil resistance "R1" corrected by using the temperature "T" of the coil, which has been predicted when, after the ignition key has been turned ON, the feedback control means 17 performs the PID feedback control for the first time. As a result, the error of the holding output duty "DHOLD" caused by the change in temperature "T" of the coil can be reduced.

Also, the control apparatus for the internal combustion engine is further equipped with the upper limit output duty calculating means 21 which calculates the upper limit output duty "DMAX" by employing the calculated resistance "R" of the electric circuit. The output duty calculating means 16 calculates the output duty "D" while setting the upper limit output duty "DMAX" as the upper limit value. As a result, it is possible to avoid that the over current flows through the coil.

As a result, the lifetime of the coil can be prolonged.

Also, the control apparatus for the internal combustion engine is further equipped with the gradient calculating means 22 and the gradient update condition judging means 23. The gradient calculating means 22 calculates the temperature gradient "K1" of the circuit resistance calculating means 19 by employing the calculated control value or the integral term, so as to update the temperature gradient "K1". When the cam phase is made substantially coincident with the actual cam phase, the gradient update condition judging means 23 permits to update the temperature gradient "K1" executed by the gradient calculating means 22. Even when the resistance "R" of the electric circuit is changed over time, the temperature gradient "K1" of the circuit resistance calculating means 19 can be corrected in connection with this change over time.

Second Embodiment

Figure 9:
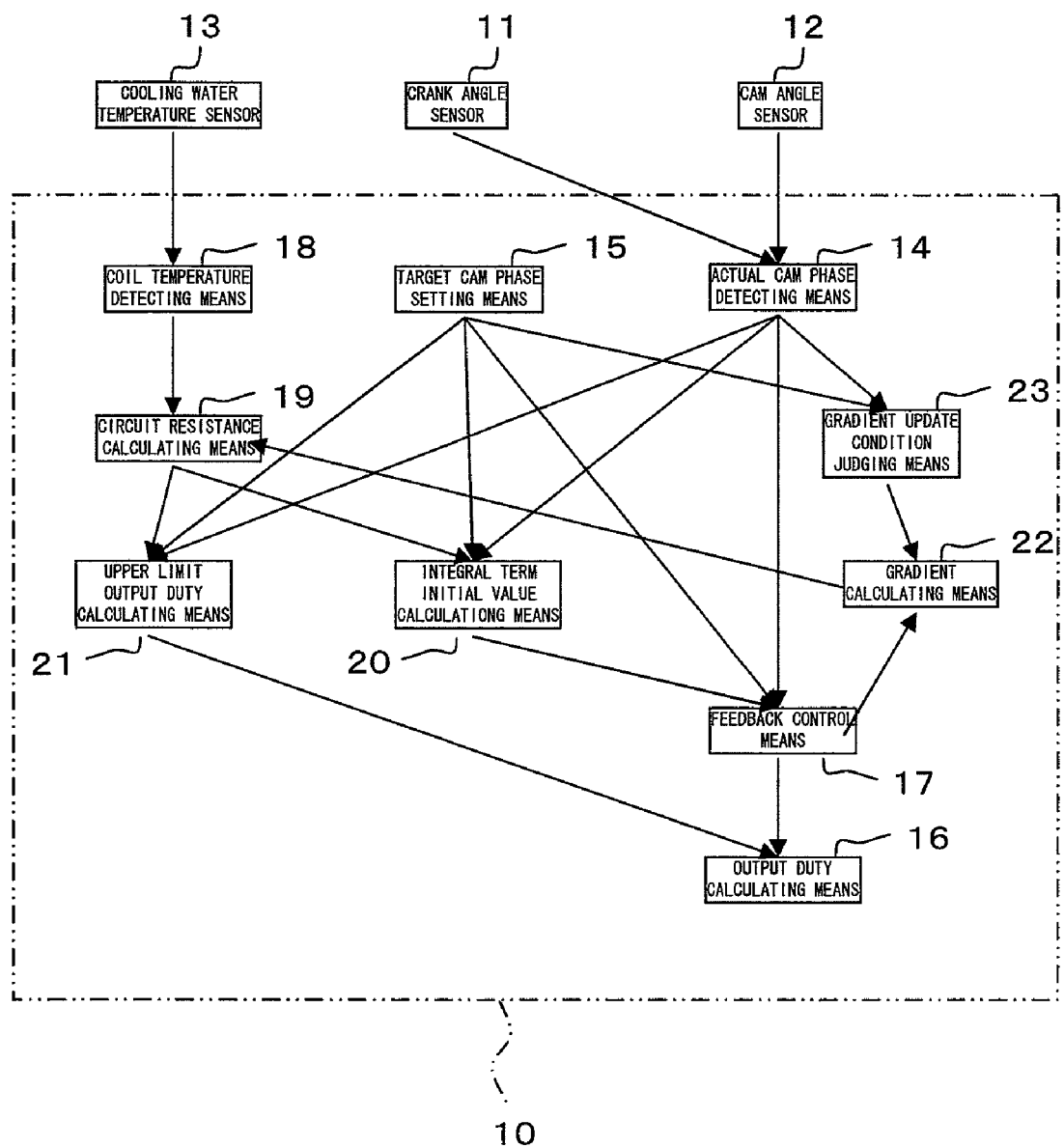
FIG. 9 is a block diagram for showing an internal arrangement of an ECU provided in a control apparatus for an internal combustion engine according to a second embodiment of the present invention.

FIG. 9 is a block diagram for showing an internal arrangement of the ECU 10 employed in a control apparatus for an internal combustion engine according to a second embodiment of the present invention.

The control apparatus for the internal combustion engine of the second embodiment is further provided with a variable cam phase mechanism (not shown), and a spring (not shown). The variable cam phase mechanism is provided between the exhaust cam shaft 4 and the second driven sprocket 6, and can pivotally move the exhaust cam shaft 4 within a predetermined range with respect to the second driven sprocket 6. The spring is provided to this variable cam phase mechanism, and biases the exhaust cam shaft 4 with respect to the second driven sprocket 6 to the advancing side.

When an internal oil pressure is reduced to zero while the oil pressure regulating valve 9 is being operated, the spring causes the exhaust cam shaft 4 to be pivotally moved to the advancing side with respect to the second driven sprocket 6.

As a result, it is possible to avoid that the intake valve overlaps the exhaust valve.

However, since the exhaust cam shaft 4 is biased to the advancing side by the spring with respect to the second driven sprocket 6, the cam phase of the exhaust cam is shifted to the advancing side.

As a consequence, in order to maintain the cam phase of the exhaust cam to a target cam phase, the oil pressure regulating valve 9 must open the flow path of the oil to the retarding chamber so as to supply the oil to the retarding chamber. At this time, the holding current must become such a current which moves the spool of the oil pressure regulating valve 9 from the neutral position in the direction along which the flow path of the oil to the retarding chamber is opened.

As described above, a holding output duty "DHOLD" [%] output from the integral term initial value calculating means 20 is calculated based upon Formula (15) described below.

$$DHOLD = (0.56 + P3 \times A1) \times R \times 100/14 \tag{15}$$

It should be noted that the value "P3" indicates a ratio of holding currents actually measured when a target cam phase of the exhaust cam to the retarding side becomes maximum to a maximum width of the target cam phase of the exhaust cam to the retarding side, and the value "A1" indicates a target cam phase of the exhaust cam.

An upper limit output duty "DMAX" of the upper limit output duty calculating means 21 can be calculated by employing Formula (15) described above in accordance with Formula (16) described below.

$$DMAX = (1 + P3 \times A1) \times R \times 100/14 \tag{16}$$

It should also be noted that, when a cam phase "A2" of the exhaust cam is made coincident with the target cam phase "A1", the upper limit output duty "DMAX" can be calculated in accordance with Formula (17) described below.

$$DMAX = (1 + P3 \times A2) \times R \times 100/14 \tag{17}$$

Other arrangements of the above-mentioned control apparatus for the internal combustion engine are similar to those of the first embodiment.

As described above, according to the control apparatus for the internal combustion engine of the second embodiment, the integral term initial value calculating means 20 further calculates the holding output duty "DHOLD" by employing the target cam phase. As a result, in such a case where the exhaust cam shaft 4 is biased by the spring to the advancing side with respect to the second driven sprocket 6, the error of the holding output duty "DHOLD" can be reduced.

Also, the upper limit output duty calculating means 21 further corrects the upper limit duty "DMAX" by employing the cam phase, or the target cam phase. As a result, in such a case where the exhaust cam shaft 4 is biased to the advancing side with respect to the second driven sprocket 6, and hence the holding output duty "DHOLD" is changed, the error of the upper limit output duty "DMAX" can be reduced in correspondence with the changed holding output duty "DHOLD".

Third Embodiment

Figure 10:
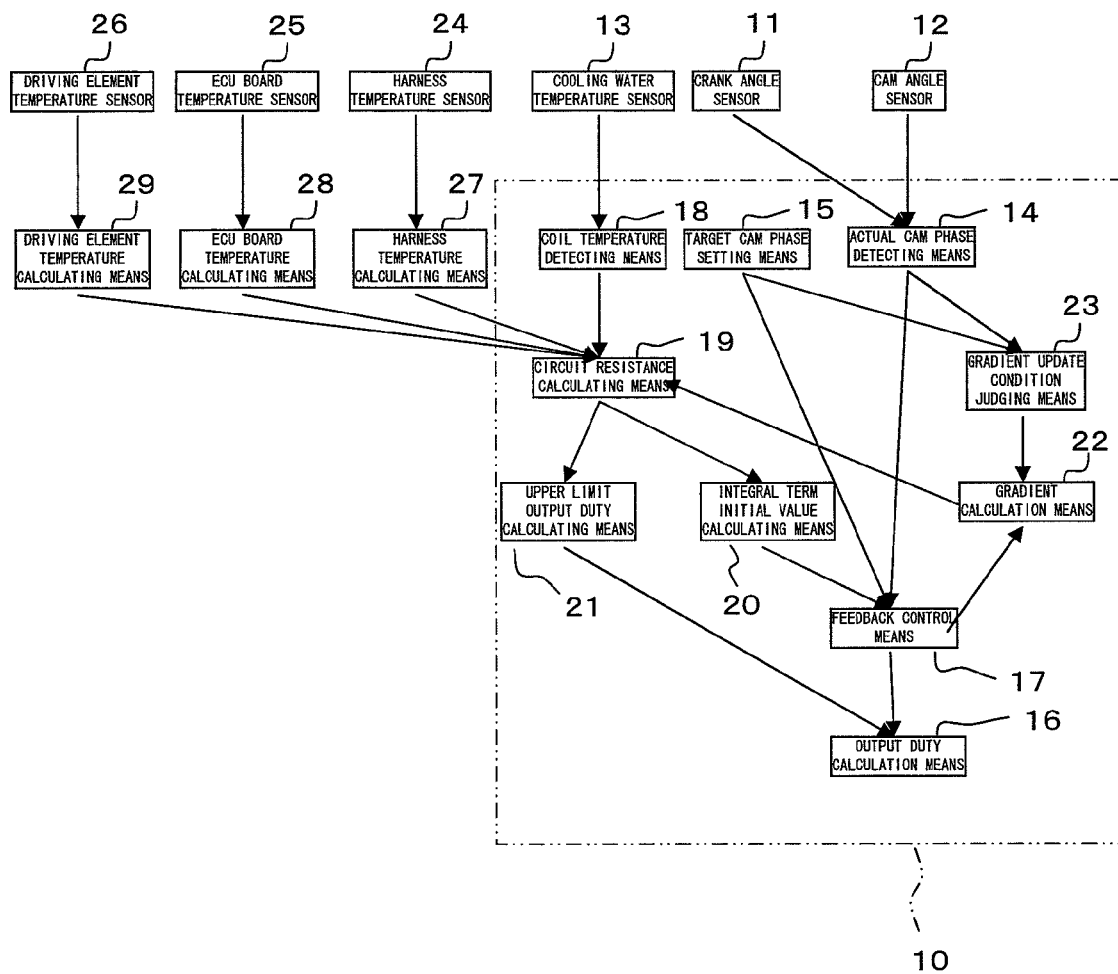
FIG. 10 is a block diagram for showing an internal arrangement of an ECU provided in a control apparatus for an internal combustion engine according to a third embodiment of the present invention.

FIG. 10 is a block diagram for showing an internal arrangement of the ECU 10 employed in a control apparatus for an internal combustion engine according to a third embodiment of the present invention.

An electric circuit portion of the oil pressure regulating valve 9 is equipped with a harness for coupling the oil pressure regulating valve 9 to the ECU 10, a board internal wiring line of the ECU 10, and a driving element for driving the oil pressure regulating valve 9.

As a consequence, the electric circuit portion resistance "R2" contains a resistance "R2H" of the harness for connecting the oil pressure regulating valve 9 to the ECU 10, a resistance "R2P" of the board internal wiring line of the ECU 10, and an ON-resistance "R2D" of the driving element for driving the oil pressure regulating valve 9.

The control apparatus for the internal combustion engine of this third embodiment is further equipped with: a harness temperature sensor 24 for detecting a temperature of the harness; an ECU board temperature sensor 25 for detecting a temperature of the board of the ECU 10; and a driving element temperature sensor 26 for detecting a temperature of the driving element which drives the oil pressure regulating valve 9.

An electric circuit portion temperature sensor is constituted by the harness temperature sensor 24, the ECU board temperature sensor 25, and the driving element temperature sensor 26.

The ECU 10 is further provided with harness temperature calculating means 27, ECU board temperature calculating means 28, and driving element temperature calculating means 29. The harness temperature calculating means 27 calculates a temperature of the harness by employing a signal input from the harness temperature sensor 24. The ECU board temperature calculating means 28 calculates a temperature of the board of the ECU 10 by employing a signal input from the ECU board temperature sensor 25. The driving element temperature calculating means 29 calculates a temperature of the driving element by employing a signal input from the driving element temperature sensor 26.

Electric circuit portion temperature detecting means is constituted by the harness temperature calculating means 27, the ECU board temperature calculating means 28, and the driving element temperature calculating means 29.

The resistance "R2H" of the harness is divided into resistivity "P4" [Ω·m] of a wire material of the harness at the temperature of 0° C., a temperature coefficient "P5" [1/K] of a resistance of the wire material of the harness, a length "P6" [m] of the wire material of the harness, and also, a sectional area "P7" [m$^2$] of the harness so as to be calculated.

As a result, assuming now that a temperature of the harness is "TH" [° C.], the resistance "R2H" of this harness is calculated based upon Formula (18) described below.

$$R2H = P4 \times (1 + P5 \times TH) \times P6/P7 \quad (18)$$

The resistance "R2P" of the board internal wiring line of the ECU 10 is divided into resistivity "P8" [Ω·m] of a metal material of a pattern on the board at the temperature of 0° C., a temperature coefficient "P9" [1/K] of a resistance of the metal material of the pattern on the board, a length "P10" [m] of the pattern on the board, and a sectional area "P11" [m$^2$] of the pattern on the board so as to be calculated.

It should also be noted that the sectional area "P11" of the pattern on the board is a value calculated by multiplying the pattern width by an average thickness of a metal film.

As a consequence, assuming now that a temperature of the board of the ECU 10 is "TP" [°C], the resistance "R2P" of the board internal wiring line of the ECU 10 is calculated based upon Formula (19) described below.

$$R2P = P8 \times (1 + P9 \times TP) \times P10/P11 \quad (19)$$

The ON-resistance "R2D" of the driving element is calculated based upon a characteristic diagram as to drain currents and an ON-resistance at gate voltages at several points at a reference temperature, a characteristic diagram as to gate voltages and ON-resistance at several points in drain currents at a reference temperature, and a characteristic diagram as to an element temperature and an ON-resistance of a drain current and a gate voltage.

The circuit resistance calculating means 19 calculates the electric circuit portion resistance "R2" based upon a summation of the resistance "R2H" of the harness, the resistance "R2P" of the board internal wiring line of the ECU 10, and the ON-resistance "R2D" of the driving element. The electric circuit portion resistance "R2" is such a resistance other than the coil resistance "R1" of the electric circuit which operates the oil pressure regulating valve 9.

As a consequence, the resistance "R" [Ω] of the electric circuit which operates the oil pressure regulating valve 9 is calculated based upon Formula (20) described below.

$$R = R1 \times (234.5 + T)/(234.5 + 20) + R2H + R2P + R2D \quad (20)$$

Other arrangements of the above-mentioned control apparatus for the internal combustion engine are similar to those of the second embodiment.

As described above, according to the control apparatus for the internal combustion engine of the third embodiment, the circuit resistance calculating means 19 corrects the electric circuit portion resistance "R2" by employing the temperature of such an electric circuit portion equal to the area except for the coil of the electric circuit which operates the oil pressure regulating valve 9. As a result, even when the temperature of the electric circuit portion is changed, it is possible to reduce the error of the resistance "R" of the electric circuit for operating the oil pressure regulating valve 9, which is calculated by the circuit resistance calculating means 19.

What is claimed is:

1. A control apparatus for an internal combustion engine, comprising:
    an oil pressure regulating valve having a solenoid;
    a variable cam phase mechanism for changing a cam phase with respect to a crank shaft by operating the oil pressure regulating valve; and
    a control unit for controlling the oil pressure regulating valve,
    the control unit comprising:
        actual cam phase detecting means for detecting the cam phase by inputting a crank angle from a crank angle sensor and by inputting a cam angle from a cam angle sensor;
        target cam phase setting means for setting a target cam phase with respect to the crank shaft according to a drive condition;
        output duty calculating means for calculating an output duty which is output to a coil of the solenoid;
        feedback control means for calculating a control value which is output to the output duty calculating means so that the cam phase is made coincident with the target cam phase to control the cam phase with PID feedback control;
        coil temperature detecting means for predicting a temperature of the coil by inputting a temperature of cooling water from a cooling water temperature sensor;
        circuit resistance calculating means for calculating a resistance of an electric circuit which operates the oil pressure regulating valve, by multiplying the predicted temperature of the coil by a temperature gradient so as to correct a resistance of the coil; and
        integral term initial value calculating means for calculating a holding output duty corresponding to the output duty in a case where the cam phase is held by employing the calculated resistance of the electric circuit, the feedback control means setting the holding output duty as an integral term in a case where the integral term is initialized.

2. A control apparatus for an internal combustion engine according to claim 1, wherein:
after an ignition key has been turned ON, when the feedback control means firstly performs the PID feedback control, the integral term is initialized; and
the holding output duty is calculated by employing the resistance of the coil which has been corrected by employing the temperature of the coil predicted when the feedback control means firstly performs the PID feedback control after the ignition key has been turned ON.

3. A control apparatus for an internal combustion engine according to claim 1, wherein:
the control unit further comprises upper limit output duty calculating means for calculating an upper limit output duty corresponding to an upper limit value of the output duty by employing the calculated resistance of the electric circuit; and
the output duty calculating means calculates the output duty, while the upper limit output duty is the upper limit value.

4. A control apparatus for an internal combustion engine according to claim 3, wherein the upper limit output duty calculating means further corrects the upper limit output duty by employing one of the cam phase and the target cam phase.

5. A control apparatus for an internal combustion engine according to claim 1, wherein the control unit further comprises:
gradient calculating means for calculating the temperature gradient by employing one of the calculated control value and the integral term so as to update the temperature gradient; and
gradient update condition judging means for permitting the gradient calculating means to update the temperature gradient in a case where the cam phase is made substantially coincident with the target cam phase.

6. A control apparatus for an internal combustion engine according to claim 1, wherein the integral term initial value calculating means calculates the holding output duty by further employing the target cam phase.

7. A control apparatus for an internal combustion engine according to claim 1, wherein:
the control unit further comprises electric circuit portion temperature detecting means into which a temperature of an electric circuit portion corresponding to an area except for the coil of the electric circuit is input from an electric circuit portion temperature sensor provided to the electric circuit portion to detect the temperature of the electric circuit portion; and
the circuit resistance calculating means corrects a resistance of the electric circuit portion by employing the temperature of the electric circuit portion.

* * * * *